(No Model.)

V. VON REITZNER.
LINEAMETER.

No. 275,734. Patented Apr. 10, 1883.

Witnesses
William L. Poulter
W. Burris

Inventor
Viktor von Reitzner

UNITED STATES PATENT OFFICE.

VIKTOR VON REITZNER, OF VIENNA, AUSTRIA-HUNGARY.

LINEAMETER.

SPECIFICATION forming part of Letters Patent No. 275,734, dated April 10, 1883.

Application filed September 25, 1882. (No model.)

*To all whom it may concern:*

Be it known that I, VIKTOR VON REITZNER, a subject of the Emperor of Austria, residing at the city of Vienna, in the Austro-Hungarian Empire, have invented certain new and useful Improvements in Lineameters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to instruments for measuring the length of lines, whether straight, curved, or compound; and it consists in the construction and operation of the mechanism, substantially as herein described, and specifically pointed out in the claims.

Figure 1:
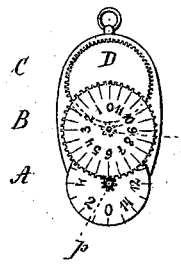
Figure 2:
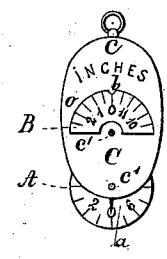
Figure 3:
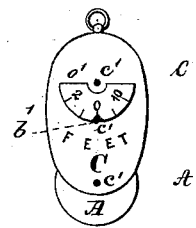
Figure 4:
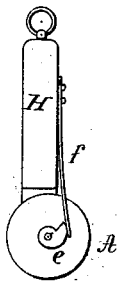
Figure 5:
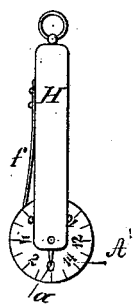

In the accompanying drawings, Figure 1 is an elevation of the improved lineameter, the front of the inclosing-case being removed; and Figs. 2 and 3 are front and rear elevations of the instrument. Figs. 4 and 5 show, respectively, a rear and front elevation of the instrument in its simplest form.

The object of the invention is not only to provide a convenient means for measuring the length of straight, curved, or compound lines, but also to construct the same in a compact form, so that it may be carried about the person or attached to a watch-chain. To this end I preferably inclose the mechanism in a casing having the form of a medallion, and to afford access to the mechanism contained therein I preferably provide the casing with a hinged or otherwise removable face.

In the above-described figures of drawings, C indicates a casing, made of any suitable material, one of the faces, c, of which is either hinged to or otherwise made removable from the body of the casing to afford access to the mechanism contained therein. The casing C has bearings c' formed in its faces for the reception of the shafts of the measuring-disks A B D and their pinions p p', and a slot at the lower end, through which the wheel A projects to adapt it to be run along a line. Both faces of the casing have an opening, o o', through which the graduations of the disks B D may be seen. The disk A has a circumference of exactly sixteen eighths, or two inches, and its face or faces bear graduations that divide the circumference into sixteen equal parts. The axis of the disk A carries a pinion, p, that has eight teeth, and meshes with a disk, B, the diameter of which is exactly seven and one-half lines. It has forty-eight teeth, and its front face bears graduations that divide the circumference of said disk B into twenty-four equal parts, which graduations may be seen through the opening o in the front face or lid. From what has been said it will be understood that the disk A has to revolve six times to effect one revolution of the disk B. The former will therefore have traveled over a distance equal to twelve inches, and the disk B will record inches. The axis of the disk B also carries a pinion, p', having six teeth, that mesh with a disk, D, the diameter of which is five lines, and which disk is provided upon its periphery with seventy-two teeth. The rear face of the disk D bears graduations that divide its circumference into twelve equal parts. Upon the lower end of either one or both faces the case carries a pointer, a, and the openings o o' may be provided with like pointers or notches b b', respectively, as shown, to facilitate the observation of the revolutions of the disks A B D. The pinion p' having six teeth, the disk B will therefore revolve twelve times to every revolution of disk D. It will be readily understood that the disk A will indicate the number of eighths of inches measured, the disk B the number of inches and half-inches, and the disk D the number of feet and half-feet or six inches. Therefore when all the disks are adjusted with their standard-marks or 0 graduation opposite the pointers a b b', (which may be done by rotating the disk A,) and the wheel or disk A is run along a line, the length thereof in lines, inches, and feet may be readily read off.

Although I prefer the construction of instrument above described, owing to the facility with which the measurements may be noted, said instrument may be considerably simplified and the disk A alone may be employed, as shown in Figs. 4 and 5. In this construction the measuring-disk A is journaled to a suitable handle, H, provided with a pointer, a. In order to adapt this form of instrument to be operated with celerity, and afford a better means than the pointer to observe and note the number of rotations of said disk, I add to the visible index an audible index, whereby each revolution of the disk is made known by a sound. Various means to effect this may be employed, one of the simplest being a cam, e, upon the disk-shaft, and a spring, f, connected with the handle H, with its free end bearing on the cam-surface. The relative arrangement of the cam, the spring, and the disk is such that when the 0 graduation of the latter is in rear of the pointer the spring f will lie on that part of the cam having the least diameter, and as the cam rotates the tension of the spring is increased until said cam has made a complete revolution, when the spring will snap off the nose of the cam and strike the same with sufficient force to produce an audible sound, by which the number of revolutions made by the disk may be counted. Of course it will be understood that, if desired, an audible index may be applied to the disk A or D of the instrument shown in Figs. 1, 2, and 3, and that the measurements may be made in lines, or lines and inches, or lines, inches, and feet, or fractions thereof.

Having now described my invention, what I claim is—

1. The casing C, provided with openings $o$ $o'$ in its opposite faces, in combination with the disks A B D, constructed and arranged for operation substantially as and for the purposes described and shown.

2. The casing C, open at one end, and provided with a removable face and openings $o$ $o'$, having indexes or pointers, the disks A B D, and pinions $p$ $p'$, all constructed and arranged for co-operation as and for the purposes specified.

In testimony whereof I affix my signature in presence of two witnesses.

VIKTOR VON REITZNER.

Witnesses:
  G. CRAMER,
  H. KOTHER.